US011156843B2

(12) United States Patent
Freese et al.

(10) Patent No.: US 11,156,843 B2
(45) Date of Patent: Oct. 26, 2021

(54) END-TO-END ARTIFICIAL REALITY CALIBRATION TESTING

(71) Applicant: Facebook Technologies, LLC, Menlo Park, CA (US)

(72) Inventors: Peter Freese, Issaquah, WA (US); Hauke Malte Strasdat, Kirkland, WA (US); Renzo De Nardi, Seattle, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/739,471

(22) Filed: Jan. 10, 2020

(65) Prior Publication Data
US 2021/0215940 A1  Jul. 15, 2021

(51) Int. Cl.
*G02B 27/01* (2006.01)
*G06T 19/00* (2011.01)
*G06K 9/00* (2006.01)
*G06T 7/73* (2017.01)

(52) U.S. Cl.
CPC ..... *G02B 27/0179* (2013.01); *G02B 27/0172* (2013.01); *G06K 9/00671* (2013.01); *G06T 7/74* (2017.01); *G06T 19/006* (2013.01); *G02B 2027/0187* (2013.01); *G06T 2207/30244* (2013.01)

(58) Field of Classification Search
CPC ............ G02B 27/0172; G02B 27/0179; G02B 2027/0187; G06T 2207/30244; G06T 7/74; G06T 19/006; G06K 9/00671

USPC .......................................................... 345/8
See application file for complete search history.

(56) References Cited

U.S. PATENT DOCUMENTS

| 10,789,438 B1* | 9/2020 | Sedighianaraki .... G06K 7/1408 |
| 2018/0124387 A1* | 5/2018 | Zhao ..................... H04N 13/246 |
| 2018/0330521 A1* | 11/2018 | Samples ................ A63F 13/213 |

OTHER PUBLICATIONS

Cutolo et al. (Cutolo, Fabrizio & Fontana, Umberto & Cattari, Nadia & Ferrari, Vincenzo. (2019). "Off-Line Camera-Based Calibration for Optical See-Through Head-Mounted Displays", Applied Sciences. 10. 193. 10.3390/app 10010193, hereinafter "Cutolo") (Year: 2019).*

* cited by examiner

*Primary Examiner* — Mark Edwards
(74) *Attorney, Agent, or Firm* — Shumaker & Sieffert, P.A.

(57) ABSTRACT

A calibration system is described that includes a calibration target having one or more calibration objects, a head mounted display (HMD), and a rendering engine configured to render, based on an estimated pose of the HMD, respective virtual calibration objects in a viewing area of the HMD at respective locations corresponding to the one or more calibration objects visible in the viewing area, wherein the HMD is configured to output the virtual calibration targets. The calibration system further includes an image capture system configured to capture image data comprising images of the viewing area of the HMD, and a calibration engine configured to compute, from the image data, difference data comprising respective distances between the one or more calibration objects and the respective, corresponding virtual calibration objects.

20 Claims, 9 Drawing Sheets

END-TO-END ARTIFICIAL REALITY CALIBRATION TESTING

TECHNICAL FIELD

The disclosure generally relates to artificial reality (AR) systems and, more particularly, to AR system calibration.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head mounted display (HMD) worn by a user and configured to output artificial reality content to the user. The HMD may include one or more components (e.g., image capture devices, illuminators, sensors, and the like) configured to capture images and other data used to compute a current pose (e.g., position and orientation) of a frame of reference, such as the HMD. The HMD selectively renders the artificial reality content for display to the user based on the current pose.

SUMMARY

In general, this disclosure describes an artificial reality (AR) calibration testing system that uses images of artificial reality content rendered to a head mounted display (HMD) to align a virtual coordinate system of the HMD with a coordinate system of a physical calibration target to facilitate calibration of the HMD. For example, an AR calibration testing system may include a head mounted display (HMD) of an AR system, a robotic apparatus, and a calibration target comprising a plurality of physical objects. In some examples, the robotic apparatus positions and moves the HMD, together with one or more image capture systems (e.g., cameras) positioned to capture image data of the HMD as if a user were wearing the HMD and viewing the image data from the perspective of the image capture system. The HMD renders one or more virtual calibration objects over at least some of the physical objects of the calibration target at a viewing area of the HMD. The one or more image capture systems capture image data, which includes both the rendered virtual calibration objects and physical objects of the calibration target visible at a viewing area of the HMD. The AR calibration testing system then determines the differences between the locations of the virtual calibration objects and the locations of the corresponding physical objects of the calibration target in the image data. In some examples, the AR calibration testing system may generate calibration or other data that is based on the differences in locations between the virtual calibration objects and the physical shapes of the calibration target in the image data. For example, the AR calibration testing system may output a report of the AR alignment characteristics/differences. The AR calibration testing system may also, or alternatively, automatically adjust AR system parameters in one or more components of the AR stack (e.g., display time delay parameters, optical stack parameters, forward prediction parameters) to address alignment errors.

In some examples, the one or more image capture systems mounted to capture image data of the HMD are physically actuated to mimic user eye and/or head movements during calibration testing. In some examples, the frame capture of the one or more image capture systems is triggered by a trigger signal from the HMD to synchronize the frame display rate of the HMD and the capture rate of the one or more image capture devices.

In one or more example aspects, a calibration system comprises a calibration target having one or more calibration objects; a head mounted display (HMD); a rendering engine configured to render, based on an estimated pose of the HMD, respective virtual calibration objects in a viewing area of the HMD at respective locations corresponding to the one or more calibration objects visible in the viewing area, wherein the HMD is configured to output the virtual calibration targets; an image capture system configured to capture image data comprising images of the viewing area of the HMD; and a calibration engine configured to compute, from the image data, difference data comprising respective distances between the one or more calibration objects and the respective, corresponding virtual calibration objects.

In one or more further example aspects, a method comprises rendering, based on an estimated pose of a head mounted display (HMD), respective virtual calibration objects in a viewing area of the HMD at respective locations corresponding to one or more calibration objects of a calibration target visible in the viewing area; outputting, by the HMD, the virtual calibration targets; capturing, by an image capture system, image data comprising images of the viewing area of the HMD; and computing, from the image data, difference data comprising respective distances between the one or more calibration objects and the respective, corresponding virtual calibration objects.

In one or more additional example aspects, computer-readable storage medium comprising instructions that configure one or more programmable processors to: render, based on an estimated pose of a head mounted display (HMD), respective virtual calibration objects in a viewing area of the HMD at respective locations corresponding to one or more calibration objects of a calibration target visible in the viewing area; output, at the HMD, the virtual calibration targets; capture image data comprising images of the viewing area of the HMD; and compute, from the image data, difference data comprising respective distances between the one or more calibration objects and the respective, corresponding virtual calibration objects.

The techniques may provide one or more technical advantages that offer at least one practical application. For example, techniques in accordance with one or more aspects of the present disclosure may help determine whether the AR system needs to be calibrated without having to rely on the subjective or inaccurate feedback from a user. By determining the differences between a rendered virtual calibration target and a physical calibration target, an AR calibration testing system in accordance with the techniques of this disclosure can determine which and the values to which AR system parameters need to be adjusted. This can help improve the artificial reality experience for a user by, e.g., providing better alignment of a virtual coordinate system of the HMD with a coordinate system of the physical environment.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
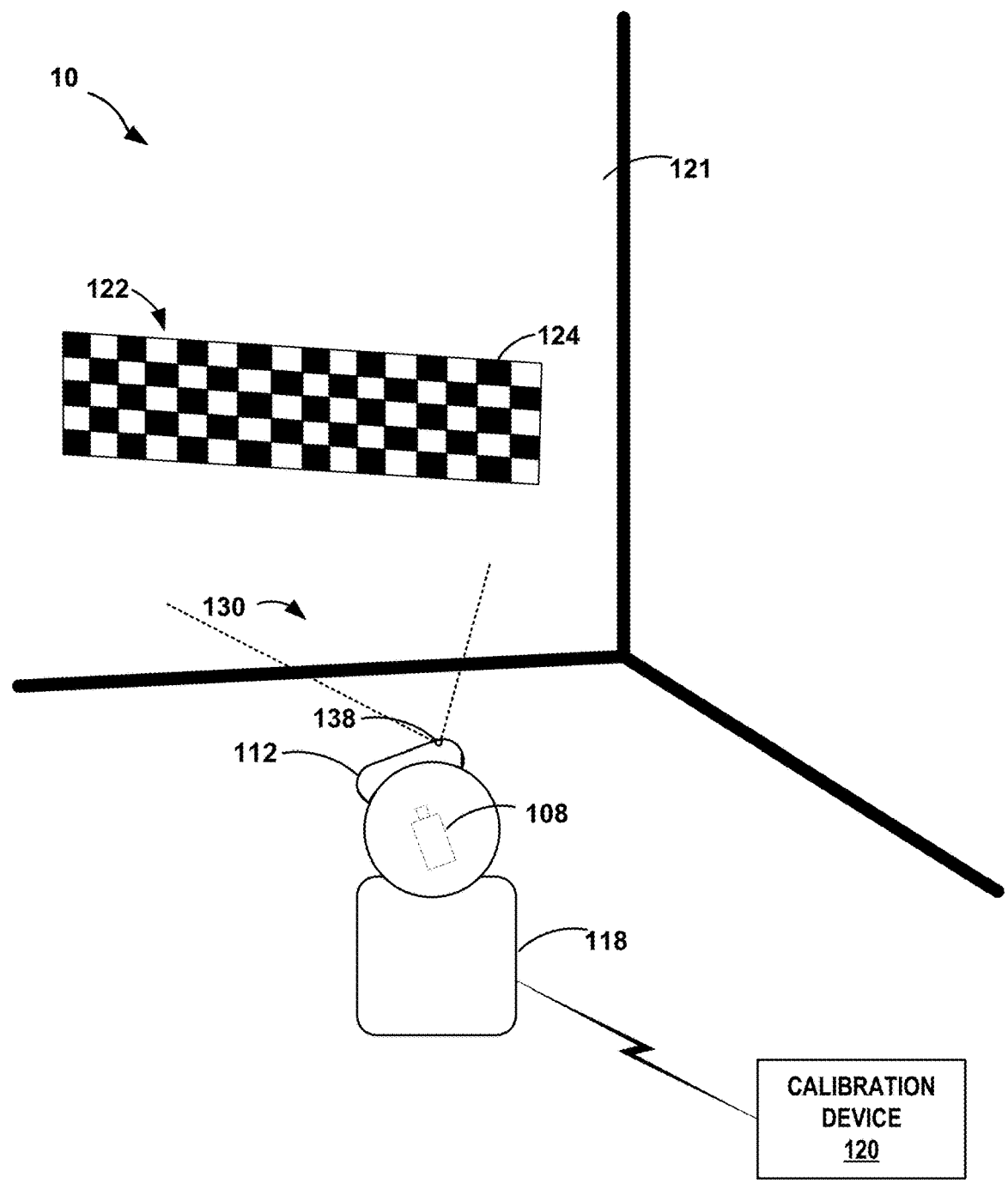
FIG. 1 is an illustration depicting example artificial reality calibration testing system, in accordance with the techniques of the disclosure.

FIG. 1 is an illustration depicting example artificial reality (AR) calibration testing system 10, in accordance with techniques of this disclosure. AR calibration testing system 10 includes a head mounted display (HMD) 112, a robotic apparatus 118, a calibration device 120, and a calibration target 122, in accordance with the techniques of the disclosure.

In general, HMD 112 may operate as a stand-alone, mobile artificial reality system, or may be part of an artificial reality system that includes a console or other computing devices. In any case, the artificial reality system uses information captured from a real-world, 3D physical environment to render artificial reality content for display to a user of the HMD. In the case of a stand-alone, mobile artificial reality system (described in more detail with respect to FIG. 3), HMD 112 constructs and renders the artificial reality content itself. In the case of an artificial reality system that includes a console or other computing devices, the console may perform at least some of the construction and rendering of the artificial reality content for display by the HMD and/or the console or other computing devices. In that example, an HMD may be in communication with, e.g., tethered to or in wireless communication with, the console. The console may be a single computing device, such as a gaming console, workstation, a desktop computer, or a laptop, or distributed across a plurality of computing devices, such as a distributed computing network, a data center, or a cloud computing system. As another example, an HMD may be associated with a peripheral device that coexists with the HMD and, in some examples, operates as an auxiliary input/output device for the HMD in a virtual environment. The peripheral device may operate as an artificial reality co-processing device to which some of the functions of the HMD are offloaded. In some examples, the peripheral device may be a smartphone, tablet, or other hand-held device.

HMD 112 includes an image capture system 138 (e.g., cameras) for capturing image data of the surrounding physical environment and may also include one or more motion sensors (e.g., accelerometers) for tracking motion of the HMD 112. More specifically, as further described herein, image capture system 138 of HMD 112 capture image data representative of objects in the real world, physical environment that are within a field of view 130 of image capture system 138. Field of view 130 typically corresponds with the viewing perspective of HMD 112. HMD 112 may comprise a passthrough display configured to allow a user of HMD 112 to view the real-world, physical environment within the field of view of HMD 112 or may be configured to operate in a passthrough mode. In some examples, HMD 112 performs pose tracking of one or more real-world objects in the captured image data and renders artificial reality content (e.g., virtual objects) overlaid, entirely or in part, upon those one or more objects (e.g., locks virtual objects to real-world objects). AR calibration testing system 10 performs end-to-end AR system testing of the alignment of virtual objects to physical, real-world objects by HMD 112 without having to rely on subjective or inaccurate feedback from a human users.

In the example of FIG. 1, HMD 112 is positioned on or affixed to robotic apparatus 118. Robotic apparatus 118 may be configured to hold HMD 112 still and/or move (e.g., translate and/or rotate) HMD 112 with respect to calibration target 122. In some examples, robotic apparatus 118 may be controlled by calibration device 120, a controller or processor within robotic apparatus 118, and/or an operator using a computing device, controller, joystick, or any other input device (not shown). In some examples, calibration device 120 may be programmed to cause robotic apparatus 118 to move HMD 112 in a particular pattern during calibration testing (e.g., to move HMD 112 through a series of poses and motions). In some examples, calibration device 120 may be programmed to cause robotic apparatus 118 to move in a random pattern during calibration testing. In some examples, robotic apparatus 118 may be a GP8, UR10, or any other robot with six degrees of freedom (6DoF).

As shown in FIG. 1, robotic apparatus 118 may include or have affixed thereon an image capture system 108 configured to capture images of a viewing area of HMD 112 from the perspective of a would-be user wearing HMD 112 (e.g., from the inside of the HMD 112 looking out into the real-world, physical environment surrounding the HMD 112). These images can include any artificial reality content displayed at HMD 112 and/or real-world objects that are visible through HMD 112 (e.g., objects that are in the field of view of HMD 112) or objects that are presented by HMD 112 in a passthrough mode (e.g., objects that are in field of view 130 of image capture system 138). In some examples, image capture system 108 may include two image captures devices corresponding to a user's eyes. In this way, AR calibration testing system 10 may test the accuracy with which the AR system presents, to a user's eyes, artificial content that is locked to real-world, physical objects. The term "locked" refers to artificial reality content that is presented at a location in the viewing area of the HMD that is relative to a physical object in the viewing area of the HMD. In some aspects, image capture system 138 and/or image capture system 108 may capture images in the visible light spectrum, the infrared spectrum, or other spectrum. Image processing described herein for identifying objects, object poses, and gestures, for example, may include processing infrared images, visible light spectrum images, and so forth. In some examples, image capture system 108 may comprise one or more RGB cameras.

Calibration target 122 is affixed on wall 121 in the example of FIG. 1. In other examples, calibration target may be positioned on a canvas or on any other surface. Calibration target 122 may comprise one or more calibration objects 124. While FIG. 1 shows calibration objects 124 as squares of the same size, it is understood that calibration objects 124 may comprise any one or more shapes and/or sizes. For example, calibration objects 124 may include any combination of circles, ellipses, ovals, triangles rectangles, and/or any other shapes of the same or varying sizes. In some examples, calibration target may comprise calibration objects 124 painted on a surface (e.g., a wall, paper, canvas, and the like). In some examples, the surface may be white or a light color. The plurality of calibration objects 124 may all be the same color. In other examples, the plurality of calibration objects 124 may vary in color. Further, while calibration target 122 includes calibration objects 124 in an array, calibration objects may be distributed in other patterns across calibration target 122.

Calibration device 120 in FIG. 1 is shown as a single computing device, which may correspond to a mobile phone, a tablet, a smart watch, a gaming console, workstation, a desktop computer, laptop, assistant device, special-purpose tabletop device, or other computing device. In other examples, calibration device 120 may be distributed across a plurality of computing devices. Calibration device 120 may be communicatively coupled with robotic apparatus 118 and/or HMD 112 using near-field communication of short-range wireless communication such as Bluetooth, using wired communication links, or using other types of communication links.

In operation, AR calibration testing system 10 or calibration device 120 initializes a calibration test by powering on HMD 112 and robotic apparatus 118. In some examples, calibration device 120 causes robotic apparatus 118 to move (e.g., rotate and/or translate) HMD 112 until calibration target 122 is within the field of view of image capture device 108. In some examples, calibration device 120 may cause robotic apparatus 118 to move HMD 112 until a simultaneous localization and mapping (SLAM) subsystem of HMD 112 detects calibration target 122 in image data captured by image capture system 138. Calibration device 120 then determines a pose of calibration target 122 based on captured image data (e.g., using image capture system 108 of robotic apparatus 118 and/or from image capture system 138 of HMD 112) and other calibration target information. For example, AR calibration testing system 10 may store a calibration target description file containing information about calibration target 122, such as the size, location (e.g., 2D and/or 3D coordinates), position, and/or orientation of calibration target 122 and/or the number, shape, size, location, and position, of calibration objects 124 and/or distance between calibration objects 124. HMD 112 may use the location and orientation of calibration target 122 in image data captured by image capture system 138 to determine a pose of HMD 112. For example, HMD 112 may determine a pose of HMD 112 relative to a pose of calibration target 122, or in the physical environment.

In accordance with techniques of this disclosure, HMD 112 renders a virtual calibration target over calibration target 122. For example, HMD 112 may render one or more corresponding virtual calibration objects (not shown) over at least some of calibration objects 124 (e.g., at the same 3D coordinates). These rendered virtual calibration objects may be the same size, shape, pose, and depth of the corresponding physical calibration objects 124 as seen in the viewing area of HMD 112. Image capture device 108 may capture image data of HMD 112, including image data of calibration objects 124 visible through HMD 112 and the one or more virtual calibration objects rendered by HMD 112. In some examples, calibration device 120 may cause robotic apparatus 118 to move HMD 112 while causing image capture device 108 to capture image data (e.g., move HMD 112 through a series of still poses and motions). Calibration device 120 may determine the difference between the rendered virtual calibration target at HMD 112 and calibration target 122 in the image data captured by image capture system 108. For example, AR calibration testing system 10 may determine the center of each calibration object 124 and each virtual calibration object in the captured image data and determine the differences between the locations of the calibration objects 124 and the locations of the corresponding virtual calibration objects in the image data (e.g., the differences between the center coordinates of the corresponding calibration objects 124 and the virtual calibration objects in the image data). This difference may be a computed as a difference in pixel location or extended to compute an estimated "physical distance" between each virtual calibration object and the corresponding calibration object 124 as if the virtual calibration object were actually present on calibration target 122.

Using computed differences between the locations of the calibration objects 124 and the locations of the corresponding virtual calibration objects, calibration device 120 may determine whether the end-to-end artificial reality stack of the artificial system including HMD 112 is properly configured. That is, determined differences between the locations of calibration objects 124 and the locations of the corresponding virtual calibration objects in the image data captured by image capture system 108 indicates error in virtual calibration objects rendering and may indicate that an AR stack can be recalibrated to improve such rendering. For example, a difference between the locations of calibration objects 124 and the locations of the corresponding virtual calibration objects in the captured image data may indicate that artificial reality parameters should be adjusted, where such artificial reality parameters may include display time delay parameters, optical stack parameters, and forward prediction parameters, for example.

Figure 2A:
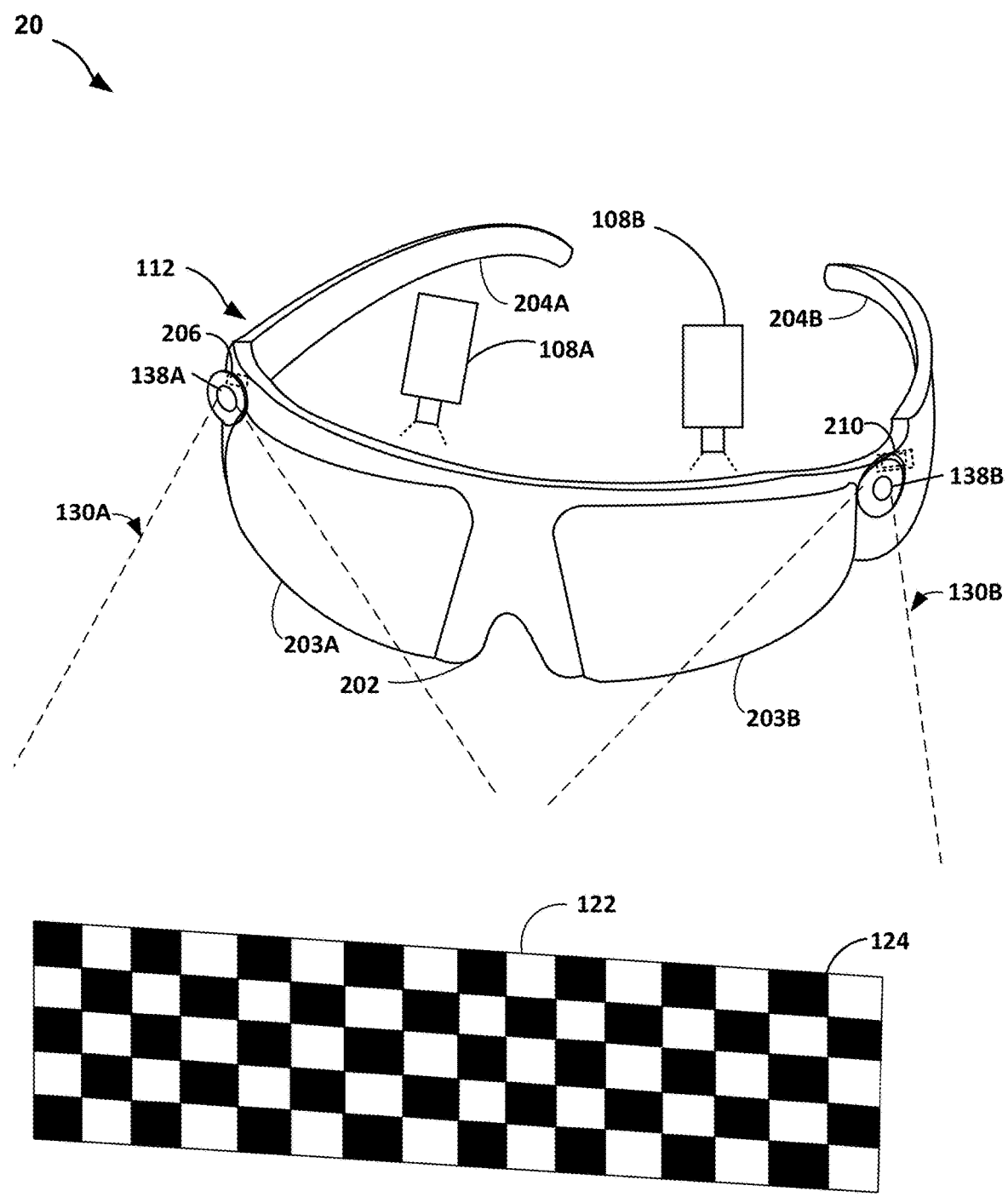
FIG. 2A is an illustration depicting example artificial reality calibration testing system, in accordance with the techniques of the disclosure.

FIG. 2A is an illustration depicting select components of an example AR calibration testing system 20, in accordance with the techniques of the disclosure. In the example shown in FIG. 2A, AR calibration testing system 20 includes HMD 112, image capture devices 108A and 108B (collectively, "image capture devices 108" or "image capture system 108"), and calibration target 122. In this example, robotic apparatus 118 and calibration device 120 of FIG. 1 are not shown for simplicity. In some examples, AR calibration testing system 20 may operate substantially similar to AR calibration testing system 10 of FIG. 1.

As shown in FIG. 2A, HMD 112 may take the form of glasses. HMD 112 of FIG. 2A may be an example of HMD 112 of FIG. 1. HMD 112 may be part of an artificial reality system or may operate as a stand-alone, mobile artificial reality system configured to implement the techniques described herein.

In this example, HMD 112 comprises a front frame including bridge 202 to allow the HMD 112 to rest on a user's nose and temples (or "arms") 204A and 204B that extend over the user's ears to secure HMD 112 to the user. In addition, HMD 112 of FIG. 2A includes interior-facing electronic displays 203A and 203B (collectively, "electronic displays 203"). In some examples, electronic displays 203 may be passthrough displays that allow the user to view the real world, physical environment through electronic displays 203. For example, calibration target 122 may be seen through or at viewing areas of electronic displays 203. Electronic displays 203 may have artificial reality content projected thereon by a projection device (not shown) for presentation on the inside of the HMD 112. In some examples, electronic displays 203 may not be passthrough displays but may be configured to operate in a passthrough mode in which they present image data captured by image capture systems 138A and 138B (collectively, "image capture systems 138"). Either way, electronic displays 203 may be configured to present artificial reality content overlaid upon one or more real world, physical objects in the viewing area of electronic displays. For example, electronic displays 203 may be configured to present virtual objects overlaid upon one or more calibration objects 124 of calibration target 122 at the viewing area of the electronic displays 203. In some examples, the virtual objects may be the same color or a different color than the corresponding real world, physical objects. In some examples, real world, physical objects may or may not be visible through the virtual objects presented at the viewing area of electronic displays 203.

Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of see-through display capable of generating visual output. In the example shown in FIG. 2A, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user. The frame of reference may also be used in tracking the position and orientation of calibration target 122 with respect to the HMD 112.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. In some examples, image capture systems 138 may comprise video cameras, laser scanners, Doppler radar scanners, depth scanners, or the like, configured to output image data representative of the physical environment. In some aspects, the image capture systems 138 can capture image data from a visible spectrum and an invisible spectrum of the electromagnetic spectrum (e.g., IR light). The image capture systems 138 may include one or more image capture devices that capture image data from the visible spectrum and one or more separate image capture devices that capture image data from the invisible spectrum, or these may be combined in the same one or more image capture systems. More specifically, image capture systems 138 captures image data representative of objects in the physical environment that are within a fields of view 130A, 130B of image capture systems 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In one example, in accordance with the techniques described herein, control unit 210 is configured to, based on the image data captured by image capture system 138, determine a pose of calibration target 122. For example, HMD 112 may store a calibration target description file as described above with reference to FIG. 1. When within the field of view 130 of the image capture systems 138, control unit 210 of HMD 112 can detect a pattern and/or size of calibration objects 124 of calibration target 122 within the image data and use the pattern and/or size of calibration objects 124 to determine a pose of calibration target 122 (e.g., using a SLAM subsystem). The control unit 210 can render virtual objects and other artificial reality content based on the determination of the estimated pose of the calibration target 122. For example, control unit 210 can render a virtual calibration target (not shown) over calibration target 122. That is, control unit 210 may render and present one or more virtual calibration objects overlaid at least some of calibration objects 124 at a viewing area of electronic displays 203. These rendered virtual calibration objects may comprise the same pose, size, and shape of the corresponding physical calibration objects 124 and appear to be at the same distance from HMD 112 (e.g., at the same depth).

In the example of FIG. 2A, image capture devices 108 may be positioned behind displays 203 and configured to capture image data presented on or by the interior-facing electronic displays 203 (e.g., of the viewing area of electronic displays 203), including image data of calibration objects 124 visible through electronic displays 203 and the one or more virtual calibration objects rendered at electronic displays 203. In some examples, image capture system 108 may comprise two image capture devices that are positioned to mimic the position of a would-be user's eyes when wearing HMD 112. In some examples, image capture devices 108 may be configured to rotate in the same way that a user's eyes would rotate. Further, in some examples, image capture devices 108 may be shaped like eyeballs or be enclosed in eye-like casings. In some examples, as described above with respect to FIG. 1, AR calibration testing system 20 may move HMD 112 while image capture device 108 captures the image data. In some examples, control unit 210 and/or AR calibration testing system 10, 20 synchronizes electronic displays 203 with the exposure windows of image capture system 108, thereby ensuring that the virtual objects are present within the image data captured by the image capture system 108 for use by control unit 210 and/or calibrating testing system 20 for AR calibration testing.

In accordance with the techniques described herein, AR calibration testing system 20 may operate similarly as AR calibration testing system 10 in FIG. 1 to determine whether the end-to-end augmented reality stack of the artificial system is properly configured.

Figure 2B:
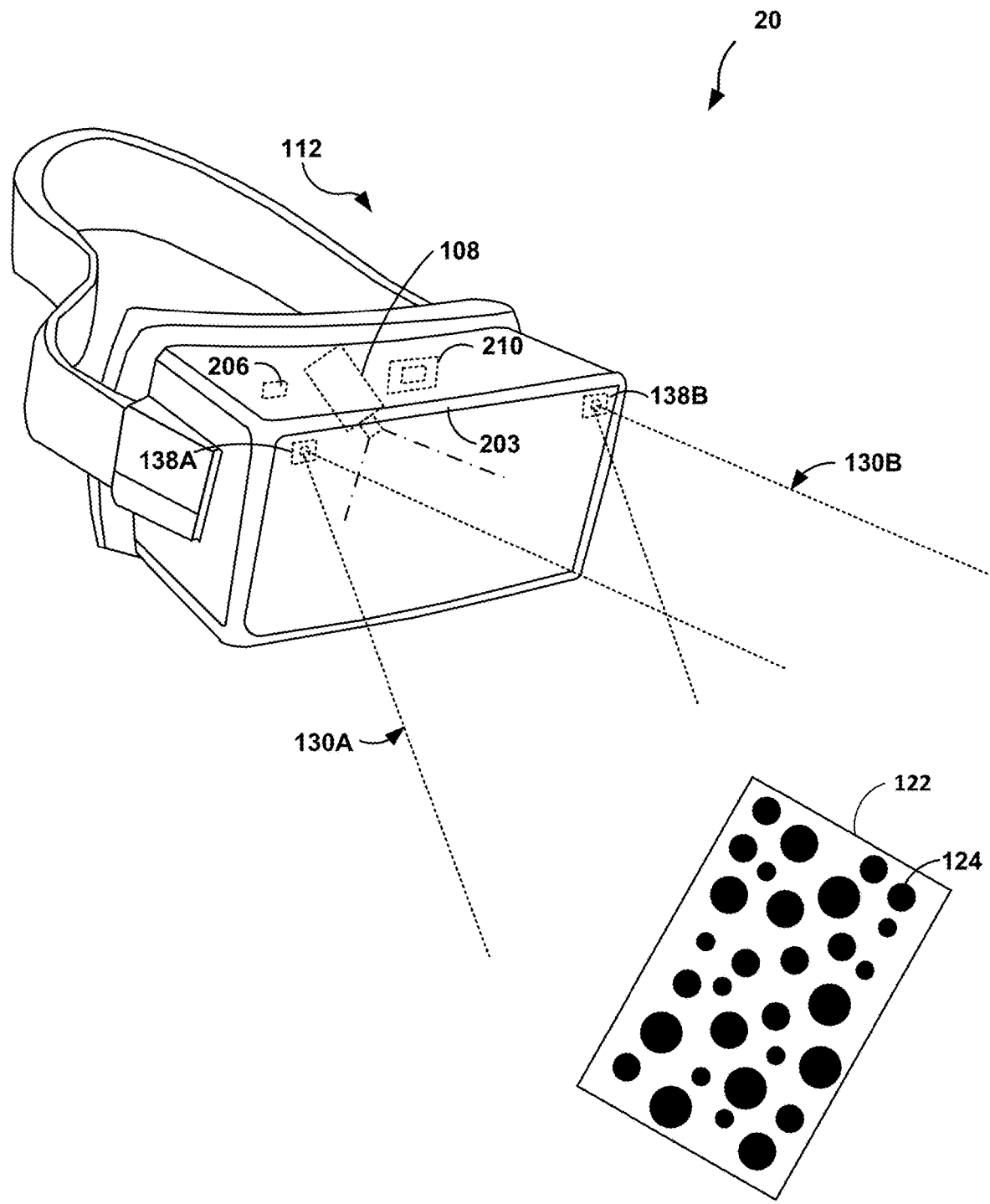
FIG. 2B is an illustration depicting example artificial reality calibration testing system, in accordance with the techniques of the disclosure.

FIG. 2B is an illustration depicting example artificial reality calibration testing system including a head mounted display, an image capture device, and a calibration target, in accordance with the techniques of the disclosure. HMD 112 of FIG. 2B may be an example of HMD 112 of FIG. 1. HMD 112 may operate as a stand-alone, mobile artificial reality system configured to implement the techniques described herein or may be part of an artificial reality system.

In this example, HMD 112 includes a front rigid body and a band to secure HMD 112 to a user. In addition, HMD 112 includes an interior-facing electronic display 203. In some examples, electronic display 203 may be passthrough display that allow the user to view the real world, physical environment through the electronic passthrough display 203. For example, calibration target 122 may be seen through or at viewing area of electronic display 203. In some examples, electronic display 203 may not be passthrough displays but may be configured to operate in a passthrough mode in which they present image data captured by image capture systems 138A and 138B (collectively, "image capture systems 138"). Either way, electronic display 203 may be configured to present artificial reality content overlaid upon one or more real world, physical objects in the viewing area of electronic displays. For example, electronic display 203 may be configured to present virtual objects overlaid upon one or more calibration objects 124 of calibration target 122 at the viewing area of the electronic display 203. In some examples, the virtual objects may be the same color or a different color than the corresponding real world, physical objects. In some examples, real world, physical objects may or may not be visible through the virtual objects presented at the viewing area of electronic displays 203.

Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. The frame of reference may also be used in tracking the position and orientation of calibration target 122 with respect to the HMD 112. In other examples, HMD 112 may take the form of other wearable head mounted displays, such as glasses or goggles.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture system 138"), such as video cameras, still cameras, IR scanners, UV scanners, laser scanners, Doppler radar scanners, depth scanners, or the like, configured to output image data representative of the physical environment. In some aspects, the image capture system 138 can capture image data from a visible spectrum and an invisible spectrum of the electromagnetic spectrum (e.g., IR light). The image capture devices 138 may include one or more image capture devices that capture image data from the visible spectrum and one or more separate image capture devices that capture image data from the invisible spectrum, or these may be combined in the same one or more image capture devices. More specifically, image capture devices 138 capture image data representative of objects in the physical environment that are within a field of view 130 of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In the example of FIG. 2B, calibration target 122 comprises calibration objects 124 in the shape of circles in varying sizes and in varying distances from each other. While FIG. 2A shows calibration objects 124 as circles, calibration objects 124 may include any combination of squares, ellipses, ovals, triangles rectangles, and/or any other shapes of the same or varying sizes. In some examples, calibration target 122 may be painted or positioned on a wall, canvas, paper, or any other surface. The plurality of calibration objects 124 may all be the same color. In other examples, the plurality of calibration objects 124 may vary in color.

In accordance with the techniques described herein, artificial reality calibration testing system 20 of FIG. 2B may operate similarly with respect to HMD 112 in the head-set form factor of FIG. 2B as with respect to HMD 112 in the goggles or glasses form factor of FIG. 2A, to analyze and configure a calibration of HMD 112.

Figure 3:
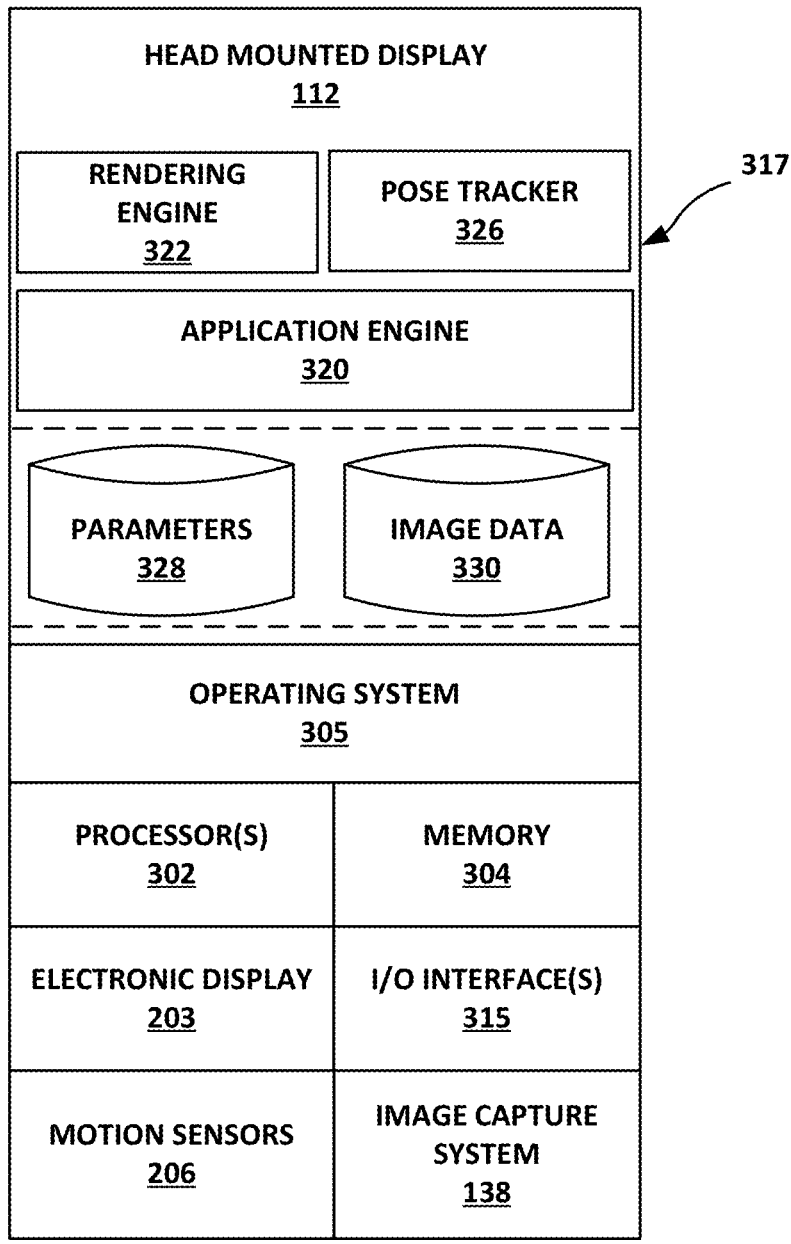
FIG. 3 is a block diagram illustrating an example instance of a HMD, in accordance with the techniques of the disclosure.

FIG. 3 is a block diagram depicting an example HMD 112, in accordance with the techniques of the disclosure. In the example of FIG. 3, HMD 112 operating as a stand-alone, mobile artificial reality system.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 317. Processors 302 are coupled to one or more I/O interfaces 315, which provide I/O interfaces for communicating with other devices such as display devices, image capture devices, other HMDs, and the like. Moreover, the one or more I/O interfaces 315 may include one or more wired or wireless network interface controllers (NICs) for communicating with a network. Additionally, processor(s) 302 are coupled to electronic display 203, motion sensors 206, and image capture system 138. In some examples, processors 302 and memory 304 may be separate, discrete components. In other examples, memory 304 may be on-chip memory collocated with processors 302 within a single integrated circuit.

Software applications 317 of HMD 112 operate to provide an overall artificial reality application. In this example, software applications 317 include rendering engine 322, application engine 320, pose tracker 326, parameters 328, and image data 330.

Parameters 328 determine how respective hardware and software components of HMD 112 operate. For example, parameters 328 may include optical stack parameters for image capture system 138 of HMD 112. The optical stack parameters may be estimated based on a correspondence between 3D real-world coordinates and 2D image coordinates. Optical stack parameters may include intrinsic and extrinsic parameters, and in some cases lens distortion parameters. The 3D real-world coordinates are transformed to 3D camera coordinates using extrinsic parameters and the 3D camera coordinates are mapped into the 2D image coordinates using the intrinsic parameters. Example extrinsic parameters of a camera include the rotation and translation used to transform from the 3D real-world coordinates to the 3D camera coordinates. Example intrinsic parameters of the camera may include the focal length (i.e., how strongly the camera converges or diverges light), the principal point (i.e., the position of the optical center), and the skew coefficient (i.e., the distortion of the image axes from perpendicular) used to map the 3D camera coordinates into the 2D image coordinates. The optical stack parameters may also include lens distortion parameters (i.e., radial distortion at the edges of the lens and tangential distortion between the lens and the camera sensor image plane). Other parameters include time delay parameters that account for time delays from the point in time in which content is generated to the point in time in which the content is presented at electronic display 203 (e.g., the delay from when content is generated to when photons from electronic display 203 hit the user's eyes). In some examples, parameters 328 may include forward prediction parameters. These forward prediction parameters may adjust optical elements to reduce distortion while HMD 112 and/or physical objects in its surrounding environment are moving. For example, forward prediction parameters, similar to time delay parameters, account for time delays from the time that content is generated to the time the content is presented at electronic display 203, but also predict the pose of HMD 112 and/or real-world, physical objects based on image data 330, data from motion sensors 206, and the time delays. In this way, the forward prediction parameters may be used to predict the location, size and orientation at which AR content should be presented at electronic display 203. In one or more aspects, parameters 328 of the components of HMD 112 may be stored in a database, a map, a search tree, or any other data structure.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on HMD 112. Responsive to control by application engine 320, rendering engine 322 generates 3D artificial reality content for display to the user by application engine 320 of HMD 112.

Application engine 320 and rendering engine 322 construct the artificial content for display to user 110 in accordance with current pose information for HMD 112 within a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment. During this process, pose tracker 326 operates on sensed data received from HMD 112 and user commands, to capture 3D information within the real-world environment, such as user motion, and/or feature tracking information with respect to the user. In some examples, pose tracker 326 includes a SLAM subsystem for determining a pose of HMD 112. For example, pose tracker 326 may use the SLAM subsystem to determine a pose of HMD 112 based on image data 330 captured by image capture system 138 that includes one or more calibration objects 124 of calibration target 122. In some examples, pose tracker 326 (e.g., the SLAM subsystem) may determine the pose of calibration target 122 based on the image data 330 and other calibration target information. For example, HMD 112 may store a calibration target description file (e.g., in memory 304) as described above with reference to FIG. 1.

Application engine 320 and rendering engine 322 can generate and render for display one or more virtual calibration objects for a calibration testing application in accordance with the techniques of this disclosure. For example, application engine 320 and rendering engine 322 may generate and render, respectively based on the pose of the HMD 112 and/or pose of calibration target 122, virtual objects overlaid upon one or more calibration objects 124 of calibration target 122 at the viewing area of the electronic display 203 (e.g., at the 3D coordinates or pose). In some examples, robotic apparatus 118 may be moving HMD 112 while application engine 320 and rendering engine 322 generates and renders the virtual calibration target. In that example, application engine 320, rendering engine 322, and/or pose tracker 326 may predict the pose of HMD 112 at the time the virtual calibration will be displayed based on motion sensor data from motion sensors 206 and parameters 328, including display time delay parameters, optical stack parameters, and/or forward prediction parameters.

In some examples, HMD 112 may receive a trigger signal and/or synchronization information via I/O interfaces 315 for controlling how and when rendering engine 322 renders and presents AR content at electronic display 203. For example, the trigger signal and/or synchronization information may be received from calibration device 120 of FIG. 1 and may specify when to start rendering AR content at electronic display 203, how long to present the content, and/or the frequency at which to present the AR content. In this way, AR calibration testing system 10, 20 may synchronize electronic display 203 with the exposure windows of image capture system 108 of robotic apparatus 118 of FIG. 1, thereby ensuring that the virtual calibration objects are present within the image data captured by the image capture system 108 for AR calibration testing.

Motion sensors 206, can include sensors such as one or more accelerometers (also referred to as inertial measurement units or "IMUs") that output data indicative of current acceleration of HMD 112, radar or sonar that output data indicative of distances of HMD 112 from various objects, or other sensors that provide indications of a location or orientation of HMD 112 or other objects within a physical environment.

Figure 4:
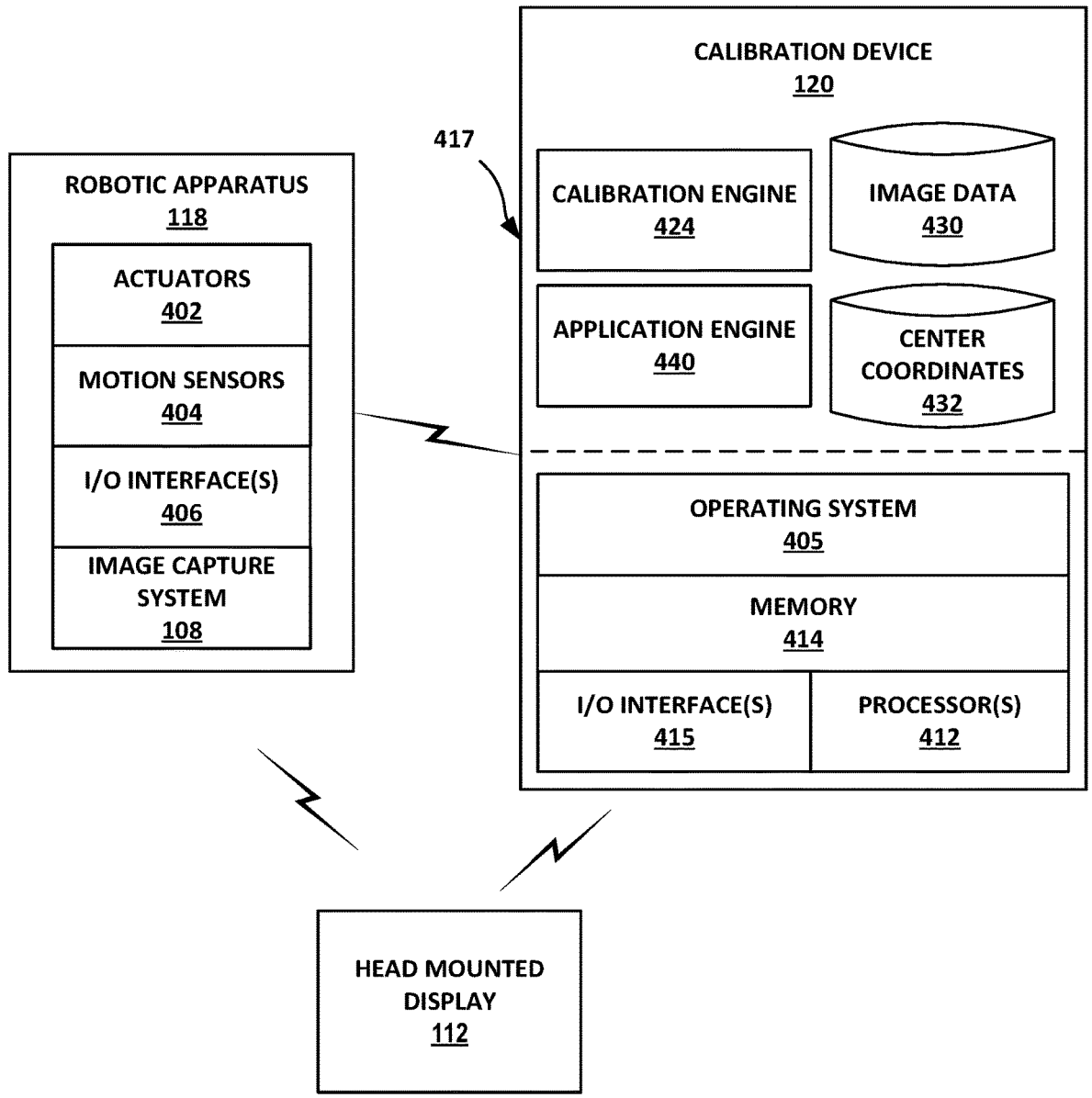
FIG. 4 is a block diagram illustrating example instances of a robotic apparatus and a calibration device, in accordance with the techniques of the disclosure.

FIG. 4 is a block diagram illustrating an example instances of robotic apparatus 118 and calibration device 120 of FIG. 1, in accordance with the techniques of the disclosure. The example in FIG. 4 also illustrates HMD 112 without internal components for simplicity.

In this example, robotic apparatus 118 includes one or more actuators 402, motions sensors, I/O interfaces 406, and image capture system 108. In one or more aspects, actuators 402 may be configured to move robotic apparatus (e.g., move about a physical environment) and/or move one or more physical components of robotic apparatus 118 (e.g., a robotic arm). For examples, actuators 402 may be configured to move a component attached to or holding HMD 112 (e.g., as shown in FIG. 1). Actuators 402 may comprise electric, mechanical, or any other type of actuator capable of perform rotation and/or translation movements for six degrees of freedom (6DoF).

Motion sensors 404, can include sensors such as one or more accelerometers (also referred to as inertial measurement units or "IMUs") that output data indicative of current acceleration of robotic apparatus 118 and/or any component of robotic apparatus 118, radar or sonar that output data indicative of distances of robotic apparatus from various objects (e.g., from wall 121 and calibration target 122 of FIG. 1), or other sensors that provide indications of a location or orientation of robotic apparatus 118 or other objects within a physical environment. For example, motion sensors 404 may provide indications of a position and/or orientation of HMD 112 and/or a component of robotic apparatus 118 that is attached to or holding HMD 112 (e.g., as shown in FIG. 1).

One or more I/O interfaces 406 provide I/O interfaces for communicating with calibration device 120 via similar I/O interfaces 415, and other devices for controlling the operation of robotic apparatus 118 such as a computing device, controller, joystick, keyboard, and the like. In some examples, I/O interfaces 406 and 415 may be used to communicatively couple robotic apparatus 118 and calibration device 120 using near-field communication of short-range wireless communication such as Bluetooth, using wired communication links, or using other types of communication links. Moreover, I/O interfaces 406 and 415 may include one or more wired or wireless network interface controllers (NICs) for communicating with a network. In some examples, calibration device 120 and/or robotic apparatus 118 may be communicatively coupled with HMD 112 using any wired or wireless communications links.

Image capture system 108 may comprise one or more image capture devices positioned behind electronic display 203 of HMD 112 (e.g., as shown in FIGS. 2A-2B) and may be configured to capture image data of a viewing area of electronic display 203. In some examples, image capture system 108 may be configured to mimic the position and movement of a user's eyes when wearing HMD 112. In some examples, robotic apparatus 118 may move HMD 112 while image capture device 108 captures the image data (e.g., using a robotic apparatus or one or more actuators). In some examples, image capture system 108 may comprise one or more RGB cameras. HMD 112 transmits the image data captured by image capture system 108 to calibration device 120 (e.g., via I/O interfaces 315, 415) in real-time, in near-real-time, or after a period of time.

In general, calibration device 120 is a device that performs AR calibration testing. For example, calibration device 120 processes image data 430 from HMD 112 for perform end-to-end testing of the alignment of virtual objects to physical, real-world objects by HMD 112. In some examples, calibration device 120 is a single computing device, such as a server, a workstation, a desktop computer, a laptop, or gaming system. In some examples, at least a portion of calibration device 120, such as processors 412 and/or memory 414, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 4, calibration device 120 includes one or more processors 412 and memory 414 that, in some examples, provide a computer platform for executing an operating system 416, which may be an embedded, real-time multitasking operating system, for instance, or other type of operating system. In turn, operating system 405 provides a multitasking operating environment for executing one or more software components 417. Processors 412 are coupled to one or more I/O interfaces 415, which provide I/O interfaces for communicating with other devices, such as robotic apparatus 118, HMD 112, a keyboard, a mouse, game controllers, display devices, image capture devices, and the like. Moreover, the one or more I/O interfaces 415 may include one or more wired or wireless network interface controllers (NICs) for communicating with a network. Each of processors 412 may comprise any one or more of a multi-core processor, a controller, a digital signal processor (DSP), an application specific integrated circuit (ASIC), a field-programmable gate array (FPGA), or equivalent discrete or integrated logic circuitry. Memory 414 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 417 of calibration device 120 operate to provide an AR calibration application. In this example, software applications 417 include application engine 440, calibration engine 424, image data 430, and center coordinates 432.

In general, application engine 440 includes functionality to provide and present an AR calibration testing application. Application engine 440 may include, for example, one or more software packages, software libraries, hardware drivers, and/or Application Program Interfaces (APIs) for implementing an AR calibration testing application on calibration device 120.

Calibration engine 424 initializes a calibration test by powering on HMD 112 and robotic apparatus 118 (e.g., via I/O interfaces 415). In some examples, calibration device 120 causes robotic apparatus 118 to move HMD 112, via actuators 402, until HMD calibration target 122 is within the field of view of image capture system 108. Calibration device 120 may cause HMD 112 to capture image data 330 of calibration target 122 using image capture system 138 and determine the pose of calibration target 122 based on the image data 330 and other calibration target information (e.g., using a SLAM subsystem). For example, calibration device 120 and/or HMD 112 may store a calibration target description file (e.g., in memory 304 and/or 414) as described above with reference to FIG. 1. HMD 112 may use the location and orientation of calibration target 122 in image data 330 to determine a pose of the HMD 112 with respect to calibration target 122.

Calibration engine 424 may cause HMD 112 to render a virtual calibration target over calibration target 122. For example, HMD 112 may render one or more virtual calibration objects over at least some of calibration objects 124. These rendered virtual calibration objects may comprise the same size, shape, pose, and depth of the corresponding physical calibration objects 124 as seen in the viewing area of HMD 112. Calibration engine 424 may further cause image capture system 108 of robotic apparatus 118 to capture image data of a viewing area of HMD 112, including image data of calibration objects 124 visible through HMD 112 and the one or more virtual calibration objects rendered by HMD 112. In some examples, HMD 112 transmits the image data captured by image capture system 108 to calibration device 120 (e.g., via I/O interfaces 315, 415) in real-time, in near-real-time, or after a period of time and calibration engine 424 stores it in image data 430. In some examples, calibration engine 424 may cause robotic apparatus 118 to move HMD 112 while causing image capture system 108 of robotic apparatus to capture image data (e.g., move HMD 112 through a series of still poses and motions). In some examples, calibration engine 424 will cause image capture system to capture image data for a period of time (e.g., several seconds) before causing robotic apparatus 118 to move HMD 112.

In one or more aspects, calibration device 120 synchronizes electronic display 203 of HMD 112 with the exposure windows of image capture system 108 of robotic apparatus 118, thereby ensuring that the virtual calibration objects are present within the image data 430. In some examples, calibration device 120 transmits a trigger signal and/or synchronization information to HMD 112 (e.g., via I/O interfaces 315, 415) for controlling how and when HMD 112 renders the virtual calibration objects. For example, the trigger signal and/or synchronization information may specify when HMD 112 should start rendering and presenting virtual calibration objects at electronic display 203, how long to present the virtual calibration objects, and/or the frequency at which to present the virtual calibration objects.

Calibration engine 424 may process image data 430 to test the AR calibration of HMD 112. In some examples, calibration engine 424 may determine the difference between the rendered virtual calibration target at HMD 112 and calibration target 122 in the image data 430. For example, calibration engine 424 may determine the center coordinates 432 of each calibration object 124 and each virtual calibration object in the image captured data 430. In some examples, center coordinates 432 comprise the X, Y or X, Y, Z coordinates of the pixels corresponding to the centers of the calibration objects 124 and virtual calibration objects in image data 430. The calibration engine 432 may then determine the difference between the center coordinates 432 of calibration objects 124 and the corresponding virtual calibration objects. In this way, calibration engine 424 may determine whether the end-to-end artificial reality stack of the artificial system and/or HMD 112 is properly configured. That is, any determined difference between the center coordinates 432 of calibration objects 124 the corresponding virtual calibration objects in the image data 430 indicates that HMD 112 is not properly calibrated. For example, a difference between the center coordinates of calibration objects 124 and the corresponding virtual calibration objects in image data 430 may indicate that parameters 328 of HMD 112 should be adjusted, including but not limited to display time delay parameters, optical stack parameters, and/or forward prediction parameters. While described herein as computing differences as distances between centers of virtual calibration objects and corresponding calibration objects 124, differences may be computed as distances between corresponding edges, points, or other aspects of virtual calibration objects and corresponding calibration objects 124.

Difference data computed between calibration objects and virtual calibration objects may include vector data with individual vectors computed between respective locations for pairs of calibration objects and corresponding virtual calibration objects, the vectors denoting differences in the locations. Calibration engine 424 may combine difference data using various techniques. For example, calibration engine 424 may compute a root-mean square error (RMSE) of the individual vectors, may compute a distribution of the vectors over the X-Y field, may compute a distribution or RMSE of the vectors over time, or compute other quantities indicative of differences between the calibration target and the artificial reality presented at HMD 112, which may be indicative of the calibration of HMD 112.

Figure 5:
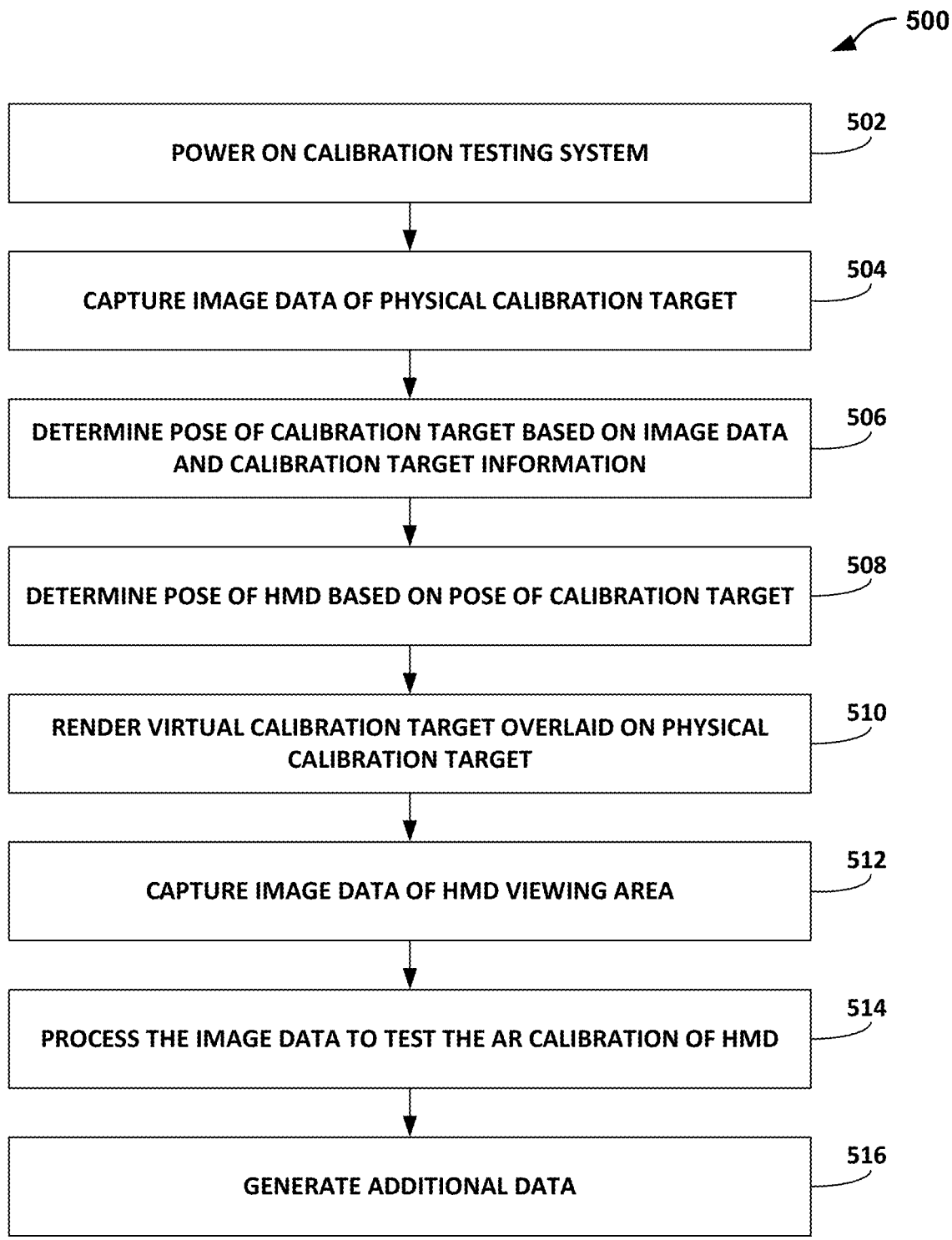
FIG. 5 is a flowchart illustrating example operations of a method for end-to-end calibration testing of an artificial reality system, in accordance with aspects of the disclosure.

FIG. 5 is a flowchart 500 illustrating example operations of a method for end-to-end calibration testing of an artificial reality system (including HMD 112 and any consoles and/or other computing devices), in accordance with aspects of the disclosure.

First, an AR calibration testing system (e.g., AR calibration testing system 10, 20) is powered on (502). For example, HMD 112, robotic apparatus 118, and calibration device 120 may be powered on. It is understood that HMD 112, robotic apparatus 118, and/or calibration device 120 need not be powered on at the same time, and may be powered on in any order. For example, calibration device 120 may be powered on first and calibration device 120 may cause HMD 112 and robotic apparatus 118 to be powered on. In some examples, a communications link is established between HMD 112, robotic apparatus 118, and/or calibration device 120 via I/O interface(s) 315, 406, and/or 415, respectively before or after they are powered on (e.g., any wired and/or wireless communication link such as a Bluetooth, Bluetooth Low Energy (BLE), Wi-Fi, and the like).

HMD 112 to captures image data 330 of calibration target 122 using image capture system 138 (504). In some examples, calibration device 120 causes robotic apparatus 118 to move HMD 112, via actuators 402, until HMD calibration target 122 is within the field of view of image capture system 108 and/or image capture system 138 (e.g., until calibration target 122 is detected by a SLAM subsystem of HMD 112). Next, HMD 112 determines the pose of calibration target 122 based on the image data 330 and other calibration target information (506). For example, HMD 112 may store (or receive from calibration device 120 via I/O interfaces 315, 415) a calibration target description file (e.g., in memory 304 and/or 414) as described above with reference to FIG. 1. HMD 112 may then determine a pose of the HMD 112 with respect to calibration target 122 based on the location and orientation of calibration target 122 in image data 330 (e.g., using a SLAM subsystem) (508).

HMD 112 then renders a virtual calibration target over calibration target 122 (510). For example, HMD 112 may render one or more virtual calibration objects over at least some of calibration objects 124 (e.g., at the locations of at least some of calibration objects 124 visible in a viewing area of HMD 112). These rendered virtual calibration objects may comprise the same size, shape, position, and depth of the corresponding physical calibration objects 124 as seen in the viewing area of HMD 112. In some examples, robotic apparatus 118 may be moving (e.g., translating and/or rotating) HMD 112 while HMD 112 renders the virtual calibration target. In that example, HMD 112 may predict the pose of HMD 112 at the time the virtual calibration will be displayed based on motion sensor data from motion sensors 206 and parameters 328, including display time delay parameters, optical stack parameters, and/or forward prediction parameters.

Image capture system 108 of robotic apparatus 118 captures image data of the viewing area of HMD 112 (e.g., from the perspective of a user using HMD 112), including image data of calibration objects 124 visible through HMD 112 and the one or more virtual calibration objects rendered by HMD 112 (512). In some examples, HMD 112 transmits the image data captured by image capture system 108 to calibration device 120 (e.g., via I/O interfaces 315, 415) in real-time, in near-real-time, or after a period of time and calibration engine 424 stores it in image data 430. In some examples, robotic apparatus 118 may move HMD 112 while image capture device 108 of robotic apparatus captures image data of HMD 112.

In one or more aspects, calibration device 120 synchronizes electronic display 203 of HMD 112 with the exposure windows of image capture system 108 of robotic apparatus 118, thereby ensuring that the virtual calibration objects are present within image data 430 captured by image capture system 108. For example, calibration device 120 may transmit a trigger signal and/or synchronization information to HMD 112 (e.g., via I/O interfaces 315, 415) for controlling how and when HMD 112 renders the virtual calibration objects. For example, the trigger signal and/or synchronization information may specify when HMD 112 should start rendering and presenting virtual calibration objects at electronic display 203, how long to present the virtual calibration objects, and/or the frequency at which to present the virtual calibration objects.

Calibration device 120 processes image data 430 to test the AR calibration of the HMD 112 (514). For example, calibration device 120 may determine the difference between the rendered virtual calibration target and calibration target 122 in individual image frames of image data 430. In this way, calibration engine 424 may determine whether the end-to-end artificial reality stack of the artificial system and/or HMD 112 is properly configured based on any determined difference. That is, any determined difference between the virtual calibration target and calibration target 122 in the image data 430 indicates that HMD 112 is not properly calibrated. For example, a difference between the virtual calibration target and calibration target 122 in the image data 430 may indicate that parameters 328 of HMD 112 should be adjusted.

Calibration device 120 generates additional data based on any difference between calibration target 122 and the virtual calibration target in image data 430 (516). For example, calibration device 120 may generate a report comprising calibration data including any difference between calibration target 122 and the virtual calibration target in image data 430. This report may include calibration information about the difference between calibration target 122 and the virtual calibration target and whether or how HMD 112 was moving while capturing image data 430. For example, the report may indicate calibration differences between calibration target 122 and the virtual calibration target at different points in time (e.g., at individual image frames) when the HMD 112 was still and/or was being moved (e.g., translated and/or rotated) by robotic apparatus 118. In this way, an administrator or user may determine what parameters 328 of HMD 112, if any, need to be adjusted (e.g., display time delay parameters, optical stack parameters, and/or forward prediction parameters) based on the calibration data in the report. In other examples, the additional data may comprise calibration data that can be used to for pose computation by HMD 112. For example, the calibration data may comprise updated parameters 328, including but not limited to updated parameter values for display time delay parameters, optical stack parameters, and/or forward prediction parameters based on the differences between the calibration target 122 and the virtual calibration target and motion information from HMD 112 and/or from robotic apparatus 118. In some example, the additional data is outputted (e.g., displayed, transmitted, printed, or uploaded to one or more HMD 112) by calibration device 120 or another computing device.

Figure 6:
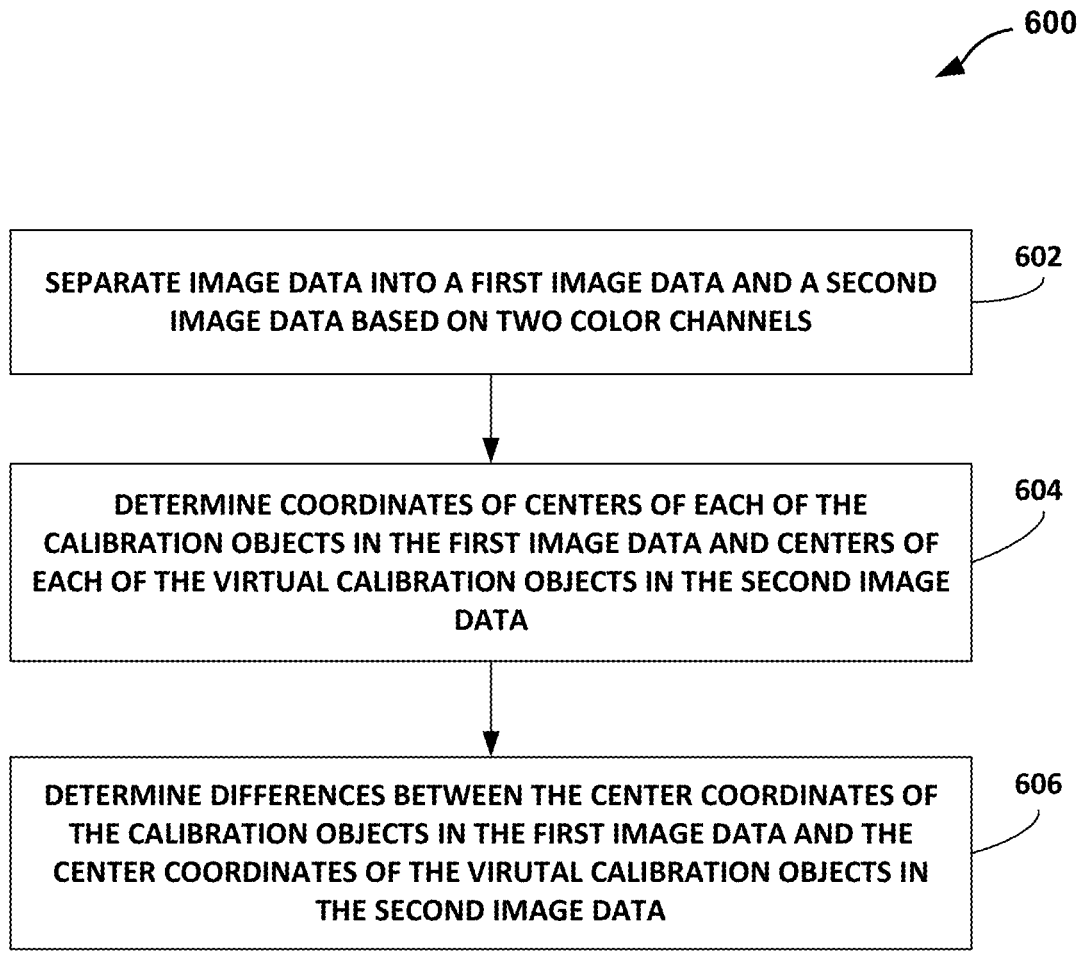
FIG. 6 is a flowchart illustrating example operations of a method for determining a difference between a physical calibration target and a virtual calibration target for an end-to-end calibration test of an artificial reality system, in accordance with techniques of the disclosure.

FIG. 6 is a flowchart 600 illustrating example operations of a method for determining a difference between a physical calibration target and a virtual calibration target for an end-to-end calibration test of an artificial reality system, in accordance with aspects of the disclosure. Flowchart 600 is one example of the functions performed by calibration engine 424 of calibration device 120 (e.g., step 514 of flowchart 500 of FIG. 5) to determine a difference between calibration target 122 and virtual calibration target in image data 430. For example, the operations of flowchart 600 may be performed by calibration engine 424 for each image frame in image data 430 (e.g., the image data capture by HMD 112 via image capture system 138).

First, calibration engine 424 may separate image data 430 (e.g., an image frame) into a first image data (e.g., a first image frame) and a second image data (e.g., a second image frame) based on two color channels (602). For example, the color of calibration objects 124 of calibration target may be a first color (e.g., blue) and the virtual calibration objects of a calibration target rendered at HMD 112 may be a second color (e.g., red) such that calibration engine 424 may separate image data 430 captured by image capture system 108 into first image data (e.g., a first image frame) using a first color channel (e.g., red channel) for calibration objects 124 and into second image data (e.g., a second image frame) using a second color channel (e.g., blue channel) for the virtual calibration objects. In this way, calibration engine 424 may easily identify calibration objects 124 in the first image and the virtual calibration objects in the second image.

In some examples, the color of calibration objects 124 may be the same as the color of the virtual calibration objects (e.g., blue). Physical objects that appear a certain color reflect the light frequency that corresponds to that color and absorb all other frequencies while an electronic display projects the light frequency that corresponds to the same color. Thus, calibration engine 424 may nonetheless separate image data 430 (e.g., an image frame) using a first color channel (e.g., red channel) for calibration targets 124 and an inverted second color channel (e.g., inverted blue channel) for the virtual calibration objects when calibration targets 124 and virtual calibration targets are the same color. For example, if calibration targets 124 and virtual calibration targets are both blue, calibration engine 424 may separate calibration objects 124 into the first image using the red channel to cause the calibration objects 124 to appear dark or black in the first image, and separate the virtual calibration objects using an inverted blue channel to cause the virtual calibration objects to appear dark or black in the second image. In this way, calibration engine 424 may easily identify calibration objects 124 in the first image and the virtual calibration objects in the second image.

Next, calibration engine 424 may determine the center coordinates 432 of each calibration object 124 in the first image data and the center coordinates 432 of each virtual calibration object in the second image data (604). In some examples, center coordinates 432 comprise the X, Y or X, Y, Z coordinates of the pixels corresponding to the centers (e.g., centroids) of the calibration objects 124 and virtual calibration objects in first image data and the second image data, respectively. The calibration engine 432 may then determine the difference between the center coordinates 432 of calibration objects 124 in the first image data and center coordinates 432 of the corresponding virtual calibration objects in the second image data (606). For example, calibration engine may determine the angular error between the center coordinates 432 for each calibration object, virtual calibration object pair in the first image data and the second image data (e.g., as described in further detail with respect to FIG. 8). A difference between the center coordinates of calibration object 124 and the corresponding virtual calibration object may indicate that parameters 328 of HMD 112 should be adjusted.

Figure 7:
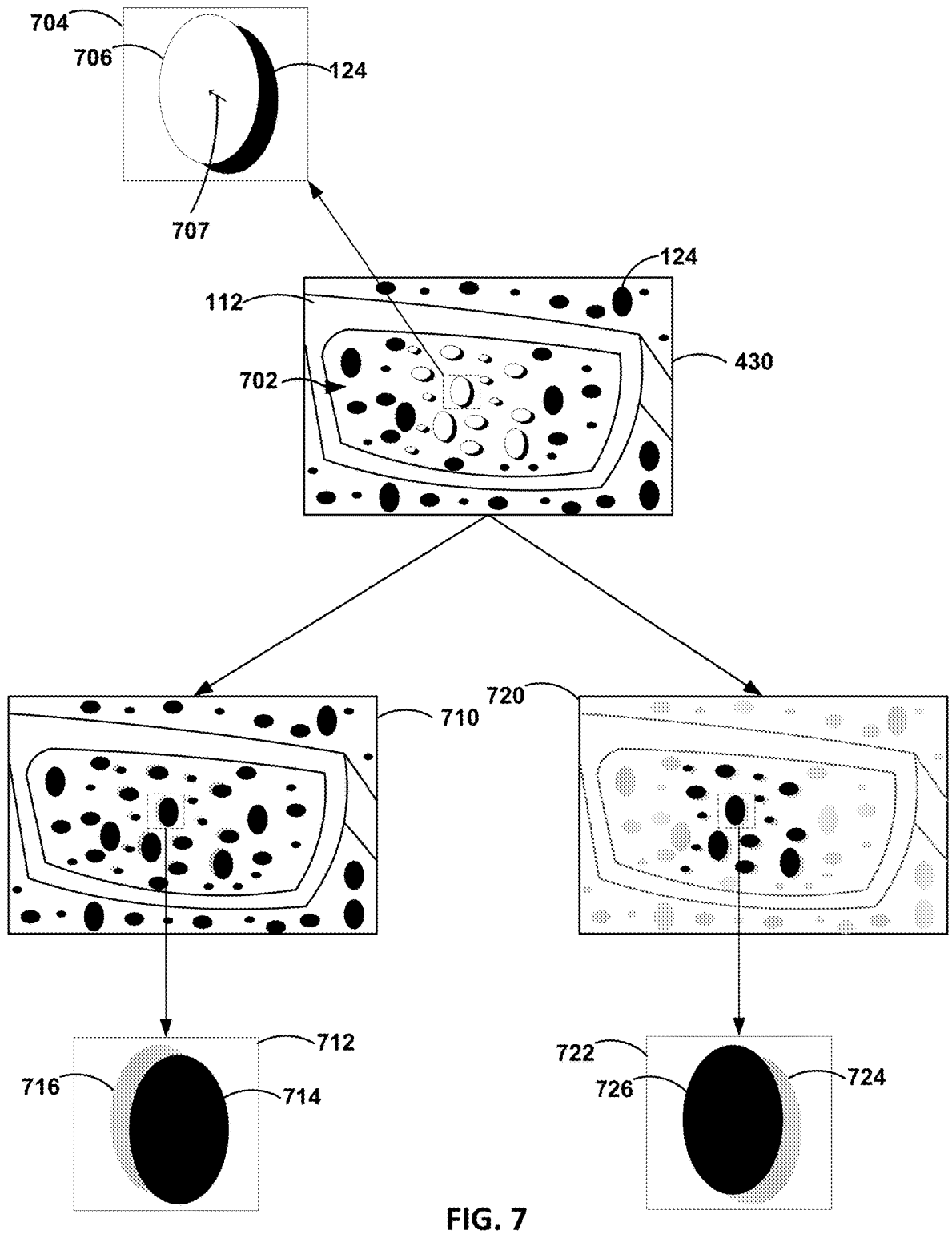
FIG. 7 is an illustration depicting example image data being separated by color channels, in accordance with the techniques of the disclosure.

FIG. 7 is an illustration depicting example image data 430 being separated into first image data 710 and second image data 720 by color channels, in accordance with the techniques of the disclosure. In some examples, image data 430 of FIG. 7 represents image data captured while robotic apparatus 118 (not shown) held HMD 112 still or while robotic apparatus 118 was moving.

As described above, image data 430 is captured by image capture system 108 and may comprise image data of a viewing area 702 of HMD 112 including one or more calibration objects 124 of calibration target 122 and one or more corresponding virtual calibration objects 706 at viewing area 702 of HMD 112. For example, image data 704 comprises a blown-up portion of image data 430 showing virtual calibration object 706 being rendered at least partially overlaid upon corresponding calibration object 124. It is understood that while calibration objects 124 are black and virtual calibration objects 706 are white in FIG. 7, calibration objects 124 and virtual calibration objects 706 may be any color including the same color. For example, calibration objects 124 and virtual calibration objects 706 may each or both be red, green, and/or blue.

Calibration engine 424 may separate image data 430 into first image data 710 using a first color channel for calibration objects 124 and into second image data 720 using a second color channel for virtual calibration objects 706 (e.g., as described above with reference to FIG. 6). In some examples, when calibration objects 124 and virtual calibration objects 706 are red, green, and/or blue, the first and second color channels may be a red color channel, a green color channel, a blue color channel, an inverted red color channel, an inverted green color channel, and/or an inverted blue color channel. For example, if calibration objects 124 and virtual calibration objects 706 are both blue, the first color channel may be the red or green color channel and the second color channel can be the inverted blue color channel. In another example, if calibration objects 124 is first color (e.g., red) and virtual calibration objects 706 are a second color (e.g., blue), the first color channel may be a color channel not corresponding to the first color (e.g., green or red) and the second color channel may be an inverted color channel corresponding to the second color (e.g., inverted blue color channel).

First image data 710 emphasizes calibration objects 714 as shown in image data 712, which is shown in FIG. 7 as an enlarged portion of first image data 710. Image data 712 of first image data 710 shows deemphasized virtual calibration targets 716 corresponding to virtual calibration objects 706 of image data 430. In some examples, first image data 710 may not include any virtual calibration objects 716. In this way, calibration engine 424 may easily identify calibration objects 714 in first image data 710.

Conversely, image data 720 emphasizes virtual calibration objects 726 as shown in image data 722, which is shown in FIG. 7 as an enlarged portion of second image data 720. Image data 722 of second image data 720 shows deemphasized calibration targets 724 corresponding to calibration objects 124 of image data 430. In some examples, second image data 720 may not include any calibration objects 724. In this way, calibration engine 424 may easily identify virtual calibration objects 726 in second image data 720. In this example, virtual calibration objects 706 and calibration objects are not aligned, which result in calibration engine determining a difference between the corresponding center coordinates (e.g., as described above with reference to FIG. 6). For example, image data 704 in FIG. 7 shows vector 707 corresponding to the difference between the center location of the illustrated calibration object 124 and the center location of its corresponding virtual calibration object 706.

Figure 8:
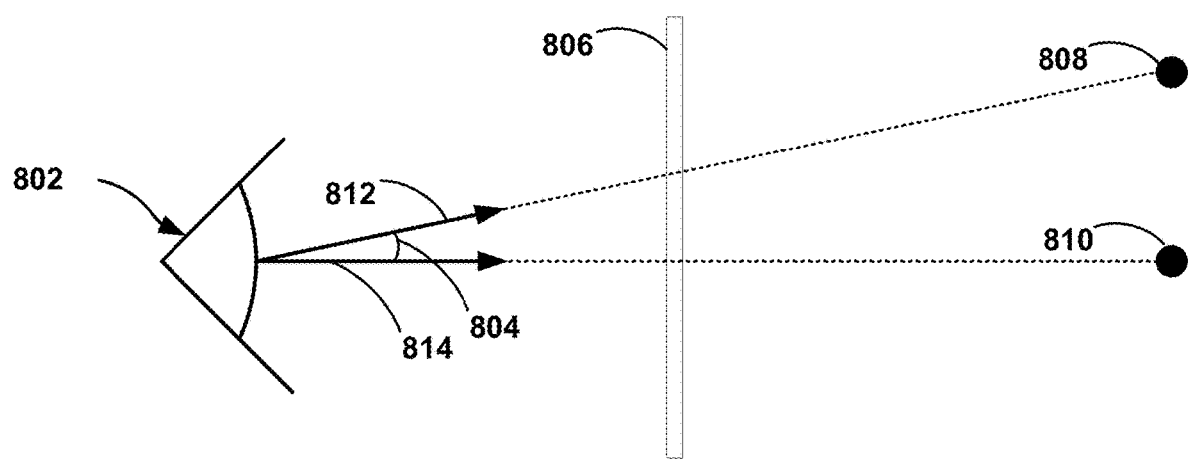
FIG. 8 is an illustration depicting an example angular error between center coordinates of a calibration object and a corresponding virtual calibration object, in accordance with the techniques of the disclosure.

FIG. 8 is an illustration depicting an example angular error 804 between center coordinates of a calibration object 808 and a corresponding virtual calibration object 810, in accordance with the techniques of the disclosure.

In the example shown in FIG. 8, point 808 may represent the center coordinates of a calibration object (e.g., calibration object 714 of first image data 710 in FIG. 7) and point 810 may represent the center coordinates of a virtual calibration object (e.g., virtual calibration object 726 of second image data 722 in FIG. 7). Vector 812 represents a vector from origin point 802 (e.g., from the image capture system 108) to center coordinates 808 and vector 814 represents a vector from origin point 802 to center coordinates 810. FIG. 8 also shows electronic display 806 which may correspond to electronic display 203 of HMD 112. While FIG. 8 illustrates coordinates 808, 810 beyond electronic display 806 (e.g., to illustrate perceived depth), it should be understood that the coordinates 808, 810 may be X,Y (e.g., 2D) coordinates within first image data and second image data, respectively. Angular error 804 may be determined in arc minutes data using the following equation:

$$\theta = \frac{10080}{\pi} \left| \arccos(\vec{r}, \vec{v}) \right| \qquad \text{Equation 1}$$

wherein $\vec{r}$ represents vector 814 from origin point 802 (e.g., from the image capture system 108) to the center coordinates 810 of a calibration object 124 and $\vec{v}$ represents vector 812 from the origin point 802 to the center coordinates 808 of the corresponding virtual calibration target. Any non-zero angular error may indicate that HMD 112 is not properly calibrated. For example, a difference between the center coordinates of calibration object 808 and the corresponding virtual calibration object 810 may indicate that one or more parameters 328 of HMD 112 should be adjusted.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), metal programmable gate arrays (MPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A calibration system comprising:
   a calibration target having one or more calibration objects having a first color;
   a head mounted display (HMD);
   a rendering engine configured to render, based on an estimated pose of the HMD, respective virtual calibration objects, the virtual calibration objects having a second color different from the first color, in a viewing area of the HMD at respective locations corresponding to the one or more calibration objects visible in the viewing area, wherein the HMD is configured to output the virtual calibration objects;
   an image capture system configured to capture image data comprising images of the viewing area of the HMD; and
   a calibration engine configured to compute, from the image data, difference data comprising respective distances between the one or more calibration objects and the respective, corresponding virtual calibration objects, wherein to compute difference data, the calibration engine is configured to:
   separate the image data into first image data, comprising the one or more calibration objects, for a first color channel corresponding to the first color and second image data, comprising the virtual calibration objects, for a second, different color channel corresponding to the second color; and
   determine, based on the first image data and the second image data, respective distances between the one or more calibration objects and the respective, corresponding virtual calibration objects.

2. The calibration system of claim 1,
   wherein the image capture system comprises a first image capture system;
   wherein the HMD includes a second image capture system configured to capture image data comprising images of the calibration target; and
   wherein the HMD is configured to determine the estimated pose of the HMD based on the image data comprising images of the calibration target.

3. The calibration system of claim 1,
   wherein the image capture system comprises a first image capture system;
   wherein the HMD includes a second image capture system configured to capture image data comprising images of the calibration target; and
   wherein the HMD is configured to determine the estimated pose of the HMD using a location of the one or more calibration objects within the image data comprising images of the calibration target.

4. The calibration system of claim 1,
   wherein the image capture system comprises a first image capture system;
   wherein the HMD includes a second image capture system configured to capture image data comprising images of the calibration target; and
   wherein the HMD includes a simultaneous localization and mapping (SLAM) subsystem, the HMD is configured to determine the estimated pose of the HMD using the SLAM subsystem on the image data comprising images of the calibration target.

5. The calibration system of claim 1, wherein the rendering engine is configured to render the virtual calibration objects further based on a calibration target description file that describes the one or more calibration objects of the calibration target.

6. The calibration system of claim 1, further comprising a robotic apparatus configured to move the HMD while the image capture system captures the image data.

7. The calibration system of claim 6, wherein the movement comprises a translation or rotation.

8. The calibration system of claim 1, wherein to determine, based on the first image data and the image data, respective distances between the one or more calibration objects and the respective, corresponding virtual calibration objects, the calibration engine is configured to:

determine first centers of the one or more calibration objects based on the first image data and second centers of the virtual calibration objects based on the image data; and determine the respective distances between the first centers of the one or more calibration objects and second centers of the respective, corresponding virtual calibration objects.

9. The calibration system of claim 1, wherein the second color channel is an inverted color channel, different than the first color channel.

10. The calibration system of claim 1, wherein the calibration engine is further configured to:
generate, based on the difference data, calibration data usable to calibrate pose computation by the HMD; and
output the calibration data.

11. The calibration system of claim 10, wherein the calibration engine is further configured to output the difference data.

12. A method comprising:
rendering, based on an estimated pose of a head mounted display (HMD), respective virtual calibration objects in a viewing area of the HMD at respective locations corresponding to one or more calibration objects of a calibration target visible in the viewing area, wherein the one or more calibration objects have a first color and the virtual calibration objects have a second color different from the first color;
outputting, by the HMD, the virtual calibration objects;
capturing, by an image capture system, image data comprising images of the viewing area of the HMD; and
computing, from the image data, difference data comprising respective distances between the one or more calibration objects and the respective, corresponding virtual calibration objects, wherein computing difference data comprises:
separating the image data into first image data comprising the one or more calibration objects for a first color channel corresponding to the first color and second image data comprising the virtual calibration objects for a second, different color channel corresponding to the second color; and
determining, based on the first image data and the second image data, respective distances between the one or more calibration objects and the respective, corresponding virtual calibration objects.

13. The method of claim 12,
wherein the image capture system comprises a first image capture system;
wherein HMD includes a second image capture system configured to capture image data comprising images of the calibration target; and
wherein the estimated pose of the HMD is determined based on the image data comprising images of the calibration target.

14. The method of claim 12, wherein determining, based on the first image data and the second image data, respective distances between the one or more calibration objects and the respective, corresponding virtual calibration objects comprises:
determining first centers of the one or more calibration objects based on the first image data and second centers of the virtual calibration objects based on the image data; and
determining the respective distances between the first centers of the one or more calibration objects and second centers of the respective, corresponding virtual calibration objects.

15. The method of claim 12, further comprising calibrating the HMD based on the difference data.

16. The method of claim 15, wherein calibrating the HMD includes adjusting display time delay parameters based on the difference data.

17. The method of claim 15, wherein calibrating the HMD includes adjusting optical stack parameters based on the difference data.

18. The method of claim 15, wherein calibrating the HMD includes adjusting forward prediction parameters based on the difference data.

19. The method of claim 12, wherein the virtual calibration objects are rendered further based on a calibration target description file that describes the one or more calibration objects of the calibration target.

20. A non-transitory computer-readable storage medium comprising instructions that configure one or more programmable processors to:
render, based on an estimated pose of a head mounted display (HMD), respective virtual calibration objects in a viewing area of the HMD at respective locations corresponding to one or more calibration objects of a calibration target visible in the viewing area, wherein the one or more calibration objects have a first color and the virtual calibration objects have a second color different from the first color;
output, at the HMD, the virtual calibration objects;
capture image data comprising images of the viewing area of the HMD; and
compute, from the image data, difference data comprising respective distances between the one or more calibration objects and the respective, corresponding virtual calibration objects, wherein to compute difference data, the instructions further configure the one or more programmable processors to:
separate the image data into first image data, comprising the one or more calibration objects, for a first color channel corresponding to the first color and image data, comprising the virtual calibration objects, for a second, different color channel corresponding to the second color; and
determine, based on the first image data and the second image data, respective distances between the one or more calibration objects and the respective, corresponding virtual calibration objects.

* * * * *